Figure 1:
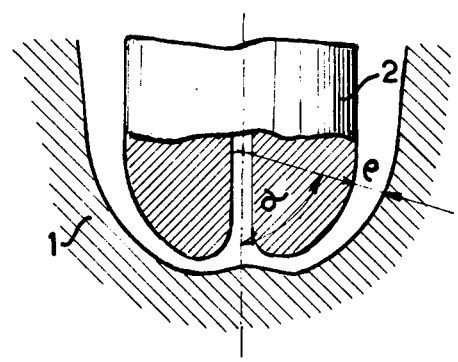

United States Patent [19]

Roche et al.

[11] 4,153,524

[45] May 8, 1979

[54] METHOD OF ELECTROCHEMICAL MACHINING

[75] Inventors: André Roche, Villars; Charles Schepacz, Firminy, both of France

[73] Assignee: Centre Technique des Industries Mecaniques, Senlis, France

[21] Appl. No.: 877,109

[22] Filed: Feb. 13, 1978

[30] Foreign Application Priority Data

Feb. 24, 1977 [FR] France .................................. 77 05450

[51] Int. Cl.² .......................... B23P 1/00; B23P 1/02; B23P 1/16
[52] U.S. Cl. ........................ 204/129.43; 204/DIG. 9; 204/129.75
[58] Field of Search .................... 204/129.43, DIG. 9, 204/129.75

[56] References Cited

U.S. PATENT DOCUMENTS

| 3,085,950 | 4/1963 | Thomas et al. | 204/129.43 |
| 3,297,555 | 1/1967 | Rerat | 204/129.43 |
| 3,607,689 | 9/1971 | Inoue | 204/129.43 |
| 4,052,274 | 10/1977 | Chikamori | 204/129.43 |
| 4,073,710 | 2/1978 | Visser | 204/DIG. 9 X |

Primary Examiner—John H. Mack
Assistant Examiner—D. R. Valentine
Attorney, Agent, or Firm—McDougall, Hersh & Scott

[57] ABSTRACT

A pulsating current comprising only positive half-waves separated by zero-current intervals is fed into an electrolyte between two electrodes in which the cathode is constituted by a tool and the anode is constituted by a part to be machined in accordance with the profile of the cathode. The electrolyte is of the passivating type which preferably contains between 30 and 50 grams per liter of sodium nitrate.

8 Claims, 2 Drawing Figures

METHOD OF ELECTROCHEMICAL MACHINING

This invention relates to machining techniques and more specifically to the techniques of electrochemical machining of metallic parts.

In the electrochemical machining process, the part to be machined is immersed in an electrolyte and subjected to surface dissolution by means of an electric current which flows through said electrolyte between two electrodes. One electrode is constituted by the part to be machined whilst the other electrode is immersed in the same electrolyte and constituted by a tool-electrode which forms the cathode and the profile of which is chosen according to the intended shape of the part to be machined.

Any extension of the applications offered by this technique has hitherto been prevented by the fact that the part obtained does not faithfully reproduce the profile of the cathode which constitutes the tool. The improvement achieved by making use of passivating electrodes of the sodium nitrate type instead of electrolytes of the sodium chloride type does not provide a sufficiently effective remedy for this drawback. Inaccuracy of machining is particularly marked when the tool has a so-called "evolutive" profile, this term being employed not only to designate hemispherical and other curved shapes but also, and in a more general sense, to designate profiles which call for a tool having a variable cross-section along the direction of feed. In this case, particularly substantial variations are observed in the machining clearance. This clearance corresponds to the interval between the surface of the electrode and the surface of the machined part as considered at different points according to the positions of these latter in a direction parallel to the direction of feed of the tool-electrode. Although it is possible in practice to make approximate calculations of the profiles obtained in the case of either a prismatic or an evolutive tool, experimental results are liable to show marked differences at the end points of the profile which is obtained ($\alpha > 80°$ in FIG. 1). In the case of each production series, it accordingly proves necessary to carry out repeated preliminary machining tests followed by successive retouching of the shape of the tool.

The present invention is directed to a method of electrochemical machining which makes it possible to overcome the disadvantages attached to the methods of the prior art, especially in order to reduce the machining clearance and to improve the fidelity of reproduction of the profile of the cathode which forms the tool. Moreover, the preferred embodiments of this method make it possible to obtain more uniform states of surface.

A method of electrochemical machining in accordance with the invention essentially consists in utilizing a pulsating current comprising only positive half-waves separated by zero-current intervals and fed into an electrolyte between two electrodes in which the cathode is constituted by a tool and the anode is constituted by a part to be machined in accordance with the profile of the cathode.

The essential difference between the method in accordance with the invention and the usual methods lies in the use of pulsating current instead of a direct current. In addition, the present invention preferably has further distinctive features which will be described in greater detail hereinafter.

The method in accordance with the invention applies to the machining of all metallic conducting materials and in particular to the machining of steels of all types. However steels which show in dissolution kinetics a curve similar to that of iron are more appropriate, which in practice includes all steels except ferritic and austenic stainless steels.

The characteristics of the pulsating current can vary to an appreciable extent according to the particular applications for which it is intended. In particular, the current can have a half-wave rectified sinusoidal waveform or a square-topped waveform. In general, its frequency is within the range of 5 to 500 c/s. Preferably, and especially if the steel to be treated is an ordinary or low-alloy steel and if it is desired to achieve a better state of surface, the frequency is within the range of 5 to 100 c/s and the current flows only for a time-duration of approximately one half-period at each period. Practically the ratio of the time duration of a positive half-wave interval to that of a zero current interval may vary between 0.8 and 1.2.

The electrolyte in which the two electrodes are immersed advantageously consists of a passivating electrolyte.

Passivating electrolytes are well-known per se. The type most commonly employed is sodium nitrate. The standard practice is to employ these electrolytes at relatively high concentrations, namely of the order of 100 to 160 grams per liter. Although such concentrations can also be employed in conjunction with pulsating currents in the method according to the invention, it has been found more advantageous to reduce the concentration of a passivating electrolyte (such as, for example, an alkali nitrate and more especially sodium nitrate) to substantially lower values which are preferably of the order of 30 to 50 grams per liter. These concentrations play a significant role in the achievement of accurate reproduction of the cathode profile. Even if the operation is carried out with direct current, such concentrations already make it possible by themselves to achieve enhanced fidelity of reproduction in accordance with the invention and to reduce the clearance between the cathode and the part which is being machined. However, when said concentrations are employed in conjunction with pulsating current, these beneficial effects are appreciably enhanced and attended by a further advantage in that a remarkably high quality standard is achieved in the state of surface of the part thus obtained.

In conjunction with pulsating currents and the low concentration of electrolyte, it proves an advantage to employ relatively low voltages, for example of the order of 5 to 10 volts and preferably 6 to 8 volts, as well as low values of tool feed which are preferably of the order of 0.1 to 1 mm per minute. The above voltages refer to the positive current intervals. During the zero-current intervals the voltage should be less than 2 volts. It also proves desirable to carry out the machining operation with electrolytes at relatively high temperatures, for example of the order of 30 to 40° C.

In general terms, the invention thus permits electrochemical machining of parts which can have a wide range of different shapes and can also have fine details while making it possible at the same time to achieve a high degree of precision without entailing any need to make corrections of the tool-electrode profile. By way of example, the degree of accuracy which it is thus possible to obtain is of the order of 0.03 mm, whereas the usual techniques do not make it possible to exceed about 0.15 mm in the case of shaped parts obtained by means of a tool-electrode having an evolutive profile. In point of fact, however, there is a very marked improvement in accuracy of machining both in the case of evolutive shapes and in the case of prismatic shapes. Moreover, the progressive increase in the electrode-part clearance is practically eliminated, even when machining parts of evolutive shape. In the practical application of the invention, the tool-electrode can therefore be constituted by a precise replica of the shape to be machined and its dimensions are deduced from those of the part, taking into account the fact that the machining clearance has a constant value.

By making use of pulsating currents, a state of surface of very high quality is obtained in a single electrochemical machining operation performed with the same tool and is equivalent to a state of surface which calls for a number of successive operations in other fine-machining processes such as electro-erosion.

Figure 2:
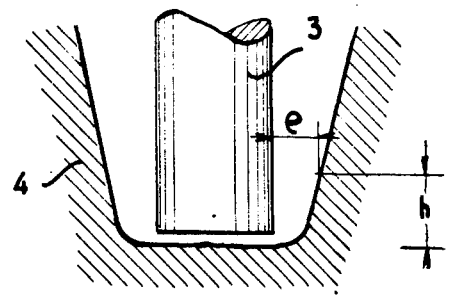

The invention will be illustrated hereinafter by means of particular examples of application which are not given in any sense by way of limitation. Reference will be made to FIGS. 1 and 2 of the accompanying drawings which illustrate respectively the process of electro-chemical machining by means of a hemispherical tool and by means of a cylindrical tool. These figures show the increase in width of the electrode-part clearance which is usually observed in electrochemical machining.

EXAMPLE I

The part to be machined is of die steel, type 42 NDC 19 and is machined by means of a tool of hemispherical shape having a diameter of 40 mm.

As shown in FIG. 1, the clearance e between the profiles of the part 1 which has been cut along its plane of symmetry and of the tool 2 are measured as a function of the angle $\alpha$ between the axis of the tool and the straight line which passes through the center of the sphere and the point considered on the machined part.

The machining operation is carried out by employing an electrolyte consisting of an aqueous solution of sodium nitrate at a temperature of 32°–33° C.

In a first test performed in accordance with a conventional method by way of comparison, direct current is employed at a voltage of 15 volts and a rate of feed of the tool of 1.0 mm per minute in an electrolyte having a concentration of 160 g/l of $NaNO_3$. At the end of the operation, the clearance has increased from approximately 0.8 in respect of $\alpha = 50°$ to 1.15 in respect of $\alpha = 80°$.

By reducing the concentration of the electrolyte to 55 g/l, the voltage to 6 volts and the rate of feed to 0.3 mm/min, there is thus obtained a clearance e which remains substantially constant at less than 0.2 mm, irrespective of the angle $\alpha$.

In further tests, the current employed is a rectified half-wave sinusoidal pulsating current having a frequency of 50 c/s and a (mean) voltage of 15.3 volts. In the case of an electrolyte concentration of 160 g/l and a rate of feed of 0.5 mm/min, the clearance e is reduced to 03. mm in respect of $\alpha = 50°$. When $\alpha = 80°$, the clearance is still only 0.6 mm.

By employing the same pulsating current but reducing the concentration of the electrolyte to 55 g/l, a constant clearance e of 0.4 mm is obtained in the case of a rate of feed of 0.1 mm/min.

Furthermore, the state of surface is improved by substituting pulsating current for direct current, both from the point of view of surface roughness and from the point of view of external appearance. The surface roughness is of the order of 2 $\mu$ Ra (in respect of 10 $\mu$ Ra in the case of direct current or even 15 $\mu$ Ra at low concentrations of electrolyte) and the surface is bright and free from any irregularity. Description of the unit of roughness: see AFNOR experimental standard E 05-015, July 1969, page 14, roughness of 3rd order: Ra.

EXAMPLE II

The conditions of machining of prismatic shapes are studied by making use of a cylindrical tool 30 mm in diameter and without lateral protection as shown at 3 in FIG. 2. The wall of the cylindrical cavity which is machined in the part 4 is subjected to a static machining process, the effect of which is to widen the lateral clearance between the electrode and the part while the tool moves downwards in the metallic mass.

As in Example I, the part obtained in different tests is cut along its plane of symmetry, its profile is lifted and then superimposed on that of the cylindrical tool-electrode. The overcut represented by the clearance or difference e between the two profiles is measured as a function of the distance h with respect to the bottom of the cavity.

Different tests are performed under conditions of machining which are similar to those of Example I.

In the case of an electrolyte concentration of 160 g/l, and if the machining operation is performed with direct current at 15 volts (at a rate of feed of 1.2 mm per minute), the clearance varies from 1.2 mm in respect of h = 4 mm to 2.0 mm in respect of h = 18 mm. If the operation is carried out with a sinusoidal pulsating current (half-wave rectified current) at 50 c/s and 15.3 volts (mean value) and at a rate of feed of 0.7 mm/min., the clearance is reduced to an appreciable extent and shows only a small variation, namely between 0.3 mm in respect of h = 4 mm and 0.7 mm in respect of h = 18 mm. The state of surface is considerably improved.

In the case of an electrolyte concentration of 55 g/l, direct-current machining (8 volts, rate of feed of 0.3 mm/min) results in low values of e which vary between 0.3 mm in respect of h = 4 mm and 0.45 in respect of h = 18 mm; the state of surface of the machined part is of poor quality. Pulsating-current machining (rate of feed of 0.2 mm/min) permits the achievement of a further reduction in the values of e which accordingly vary between 0.25 mm in respect of h = 4 mm and 0.4 mm in respect of h = 18 mm; the state of surface is excellent.

As will be readily apparent, the invention is not considered to be limited in any sense to the particular conditions mentioned in the foregoing examples.

We claim:

1. A method of electrochemical machining, wherein a pulsating current comprising only positive half-waves separated by zero-current intervals is fed into an electrolyte between two electrodes in which the cathode is constituted by a tool and the anode is constituted by a part to be machined in accordance with the profile of the cathode, wherein the current is a pulsating current having a frequency within the range of 5 to 500 c/s and having a half-wave rectified sinusoidal waveform or a square waveform.

2. A method of electrochemical machining as defined in claim 1, wherein the electrolyte is a passivating electrolyte.

3. A method of electrochemical machining as defined in claim 1, wherein the electrolyte is constituted by a solution of passivating electrolyte of the alkali nitrate type having a concentration of the order of 30 to 50 grams per liter.

4. A method of electrochemical machining as defined in claim 1, wherein the rate of feed imposed on the tool with respect to the part is of the order of 0.1 to 1 millimeter per minute.

5. A method of electrochemical machining as defined in claim 1, wherein the current is a pulsating current having a frequency within the range of 5 to 100 c/s.

6. A method of electrochemical machining as defined in claim 1, wherein said method is applied to machining of steels.

7. A method as defined in claim 3, wherein the passivating agent is sodium nitrate.

8. A method as defined in claim 1, wherein the voltage employed is within the range of 5 to 10 volts and preferably 6 to 8 volts.

* * * * *